May 9, 1967  J. D. BALL ETAL  3,319,221
APPARATUS FOR MEASURING TRAVEL TIME OF SEISMIC WAVES FROM
THE EARTH'S SURFACE TO A GIVEN DEPTH IN THE EARTH
Filed July 21, 1965
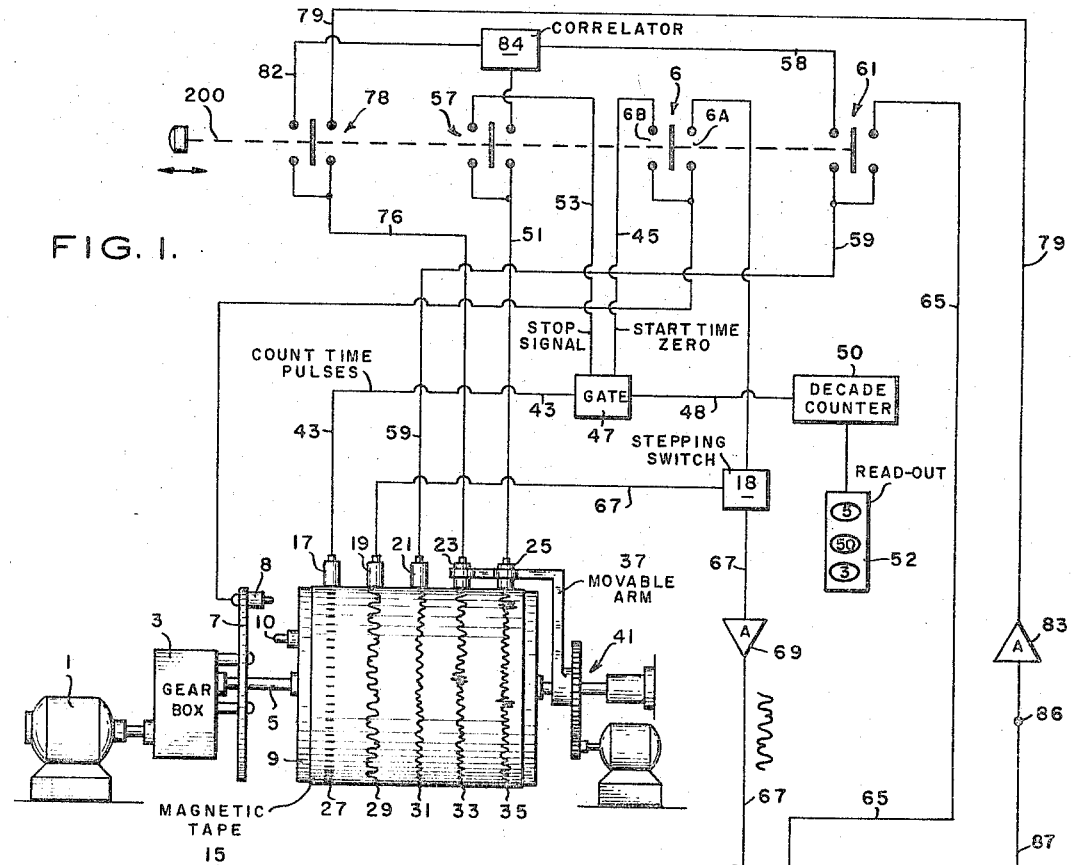
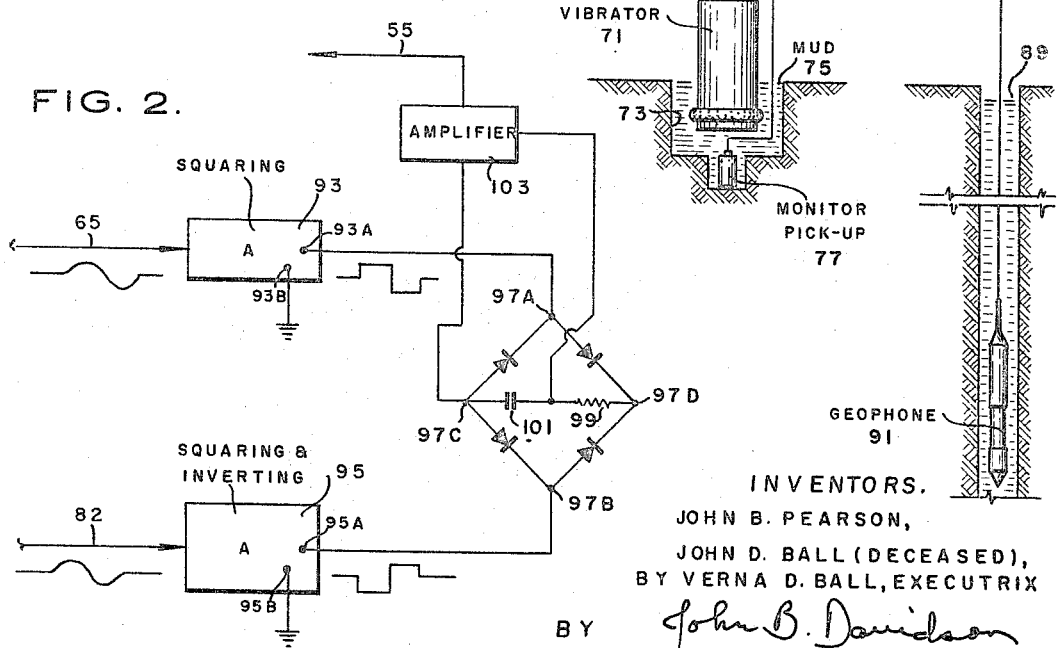
INVENTORS.
JOHN B. PEARSON,
JOHN D. BALL (DECEASED),
BY VERNA D. BALL, EXECUTRIX
BY John B. Davidson
ATTORNEY.

United States Patent Office 3,319,221
Patented May 9, 1967

3,319,221
APPARATUS FOR MEASURING TRAVEL TIME OF SEISMIC WAVES FROM THE EARTH'S SURFACE TO A GIVEN DEPTH IN THE EARTH
John D. Ball, deceased, late of Harris County, Tex., by Verna D. Ball, Executrix, Harris County, Tex., and John B. Pearson, Harris County, Tex., assignors to Esso Production Research Company, a corporation of Delaware
Filed July 21, 1965, Ser. No. 474,220
5 Claims. (Cl. 340—15.5)

ABSTRACT OF THE DISCLOSURE

Seismic wave travel time between the earth's surface and a given level in a borehole is measured by prerecording a pseudo-random signal in reproducible form, reproducing the signal, and with the reproduced signal, injecting a corresponding seismic signal into the earth. A recording is made of the resulting seismic waves detected at the given level in the borehole. The reproducible record and the recording are cross correlated to produce a correlogram, and a measurement is made of the time on the time axis of the correlogram to the major correlation lobe thereof. All of the records are made on the same recording medium.

This invention relates to geophysical prospecting, and more particularly to apparatus for measuring the average velocity of seismic waves from the earth's surface to a particular level in a borehole.

In geophysical work in areas of exploration interest, it is usually desirable to measure the subsurface velocity as a function of depth. Usually, this is done by measuring the travel time of a seismic pulse produced by an explosive charge at the earth's surface to a geophone lowered into a borehole. Successive measurements to successive depths of the geophone constitute the conventional seismic velocity survey. In recent years there has come into use an instrument known as the seismic continuous velocity logger which measures the incremental velocity of seismic waves through earth formation surrounding a borehole. The average velocity from the earth's surface to any particular depth can be obtained using this instrument by planimeter measurements of the log curve area. However, the instrument is usually incapable of logging the seismic velocity at shallow depths, and this shortcoming precludes its use in the measurement of average velocity. The average velocity from the earth's surface to a depth at which a continuous velocity log is valid, measured by whatever method is available, adds to the integrated velocity log information to give the average velocity from the earth's surface to any depth of the continuous velocity log. At present, this "time-tie" information usually is obtained by shooting techniques. The service companies who make continuous velocity logs are unwilling to undergo the hazard and inconvenience of detonating explosive charge to obtain the time-tie information. Unless operating company personnel or a special contractor obtains the time-tie information, an expensive procedure at best, this valuable information usually is not obtained.

Objects and features of the invention not apparent from the above discussion will become evident upon consideration of the following detailed description thereof taken in connection with the accompanying drawings, wherein:

FIG. 1 is a schematic diagram of a preferred embodiment of the invention; and

FIG. 2 is a schematic diagram of an integrator for use with the apparatus of FIG. 1.

With reference now to FIG. 1, there is shown an earth vibrator 71, or electro-seismic wave transducer, coupled to the earth in the usual fashion by a liquid medium 75 in a small hole 73 in the earth at the earth's surface. Immediately below vibrator 71 is positioned a monitor pickup 77 for detecting seismic waves and producing electrical signals indicative of the seismic waves injected into the earth by the vibrator or transducer 71. The vibrator 71 may be of the electro-acoustic wave type making use of a hydraulic amplifier, or a modified loudspeaker type where a piston or diaphragm is actuated by an electrical winding to produce earth vibrations. The vibrator 71 is positioned in the immediate vicinity of a bore hole 89, into which is lowered a geophone 91 at the end of a logging cable 87. The electrical signals produced by the geophone 91 when it detects seismic waves are transmitted to the earth's surface by electrical conductors in the logging cable. The logging cable is electrically connected to terminal means 86.

Electrical signal recording and reproducing apparatus is provided which includes a transport drum 9 driven by a motor 1 through a reducing gear box 3 and a shaft 5. The drum 9 functions as a recording medium transport means for supporting a recording medium 15, which preferably is a conventional magnetic tape such as is used in multitrace seismic application. A plurality of recording heads 17, 19, 21, 23, and 25 are disposed immediately adjacent the recording medium 15 for the purpose of recording and reproducing electrical signals on tracks 27, 29, 31, 33, and 35, respectively. A cam-operated switch 8 is disposed adjacent the recording drum 9 and may be either fixedly or movably supported by a support means 7, which is connected to a housing for the recorder or to a fixed portion of the recording apparatus, such as the gear box 3. The switch 8 may be of the type manufactured by Cherry Electric Company and designated by them model No. E10–009N. The switch 8 is momentarily actuated on each revolution of the drum 9 by a projection or cam 10 on the drum. Recording heads 23 and 25 are connected mechanically together so as to be moved around the periphery of the drum at a predetermined fraction of the rotational speed of the drum by a speed-reducing gearing mechanism 41, which is connected to an L-shaped arm 37 which supports heads 23 and 25. Heads 17, 19, and 21 are immovably supported relative to the drum 9 in line with switch 8 by conventional apparatus which is not shown. Each of the heads 17, 19, 21, 23, and 25 is adapted not only to record electrical signals on the recording medium 15, but also to reproduce as electrical signals the traces previously recorded on the recording medium. Recording head 17 reproduces a clock pulse signal that is previously recorded on the track 27, and recording head 19 reproduces a pseudo-random signal which has been previously recorded thereby on track 29 of the recording medium. The pseudo-random signal may be any of several types well known to the art, and preferably is a constant frequency, sinusoidal signal varied between opposite phases in accordance with a binary code of maximal length. For example, binary one's may be represented by one phase, and binary zero's by the other phase, each binary bit being represented by one cycle of the sinusoidal signal. A frequency of between 15 and 100 cycles per second is satisfactory for use with the invention, and a frequency of 70 c.p.s. is preferred. When a binary code of maximal length is used, if the code has either 511 or 1023 bits in it, the reproduced signal will have a duration of 7.3 and 14.6 seconds, respectively. The clock pulse signals reproduced by head 17 are transmitted on a line 43 to a gate 47 for purposes to be described below. The pseudo-random output signals from head 19 are transmitted on line 67 controlled by switch 18 to amplifier 69 and then to vibrator 71 to actuate the vibrator so that seismic signals variable in amplitude in accordance with variations in the electrical signal produced by head 19 are transmitted into the earth. Switch 18 may be a stepping switch having alternate open and closed positions, such as is manufactured by Cutler Hammer Company and designated type ST505AN3027-7. Switch 18 is controlled by the pulse signal from cam-actuated switch 8 and is stepped from position to position thereby so that the head 19 is connected to and disconnected from amplifier 69. The output signals from switch 8 are coupled to switch 18 when switch 6 is thrown so as to engage contacts 6A thereof. When switch 6 is thrown to its other position, the output pulses produced by cam-actuated switch 8 are coupled to gate 47 on line 45 to open the gate for time counting purposes. Head 21 is connected to monitor pickup 77 through line 59, switch 61, and line 65. The output signals from geophone 91 appearing at terminal 86 are fed to head 23 through amplifier 83, line 79, switch 78, and line 76. Heads 21 and 23 are also coupled to the input circuits of an electrical correlator 84. Head 21 is so connected through line 59, switch 61, and line 58, while head 23 is connected to the correlator 84 through line 76, switch 78, and line 82. The output signals from the correlator are fed to head 25 through switch 57 and line 51. Switch 57 in its other position also connects head 25 to a gate-closing circuit of gate 47 through lines 51 and 53. Gate 47 may be a relay or other conventional electrical gate adapted to couple the clock signals appearing on line 43 to an output circuit thereof after a pulse has been received on line 45 and before a pulse is received on line 53. The output signals from the gate appearing on line 48 are applied to a counting circuit means including decade counter 50 and a counter readout apparatus 52. A suitable decade counter and readout device is manufactured by Beckman Instruments Company, model No. 6144. The switches 78, 61, and 57 may be separately actuatable, but preferably are connected together by mechanical connection 200 such that in one position thereof switch 8 is connected to line 45, line 51 is connected to line 53, line 76 is connected to line 82, and line 59 is connected to line 58, and in the other position thereof switch 8 is connected to switch 18, line 76 is connected to line 79, line 51 is connected to the output circuit of correlator 84, and line 59 is connected to line 65.

The operation of the apparatus described above is as follows. Let it be assumed that the switches 78, 61, and 57 are thrown to the second position referred to immediately above and switch 18 is connected to an open position such that head 19 is disconnected from amplifier 69 and that switch 6 connects switch 8 to switch 18. Electrical motor 1 is energized such that drum 9 is brought up to speed and turns through one revolution thereof. When cam 10 strikes switch 8, switch 18 will be closed to connect head 19 to amplifier 69, and vibrator 71 will be actuated to inject seismic waves into the ground. The output signals of monitor pickup 77 and geophone 91 will be recorded on the recording medium 15 by heads 21 and 23, respectively, as traces on tracks 31 and 33. The duration of the signal produced by vibrator 71 should be only a portion of one revolution of the drum 9 so that all of the signals produced by vibrator 71 will be detected by geophone 91 and recorded on the recording medium 15 during one revolution of the drum. At the end of the cycle, cam 10 will again actuate switch 8 to send a pulse to switch 18 which will disconnect head 19 from vibrator 71 so that the vibrator cannot be actuated by the output signals of head 19 even though the drum turns through a portion of another revolution thereof. Motor 1 is de-energized after one operating cycle of the drum and the drum is brought to rest, as by the use of brake means, not shown. Switch 6 is opened, and switches 61, 57, and 78 are then thrown to the first position thereof referred to above, or this entire operation may be automatic. Heads 23 and 25 are in alignment with head 21, and motor 1 is again energized. The traces on tracks 31 and 33 are reproduced as electrical signals by heads 21 and 23 and coupled to the input circuits of electrical correlating means 84. The output signal of the correlating means is recorded by head 25. As drum 9 rotates, arm 38 also rotates at a fraction, such as $\frac{1}{1000}$, of the rotational speed of the drum. After each correlation cycle (or rotation of the drum 9), the information stored by the integrator condenser (i.e., the condenser charge) is dumped into head 25 and recorded thereby on track 35 to produce a recordation indicative of the charge. The time relationship of the signals produced by heads 21 and 23 is slowly varied as head 23 is moved. Thus, the output signals of the correlator 84 recorded by head 25 are indicative of the correlation between the signals produced by heads 21 and 23. The trace on track 35 produced by the sequential recordations of the charges of the integrators is indicative of the travel time of signals from vibrator 71 to geophone 91, the travel time being equal to the time on the time axis of track 33.

Switch 6 is then thrown to connect switch 8 to line 45 and the other switches are returned to the second position thereof referred to above such that head 25 is connected to gate 47. Head 25 is aligned with head 17 and switch 8, as illustrated in FIG. 1, and motor 1 is again energized. When cam 10 strikes switch 8, a pulse is transmitted to gate 7 by line 45 to permit clock pulses produced by head 17 to be fed through gate 47 to decade counter 50. The pulses will continue to be so fed until head 25 produces a pulse as a result of reaching a correlation peak in the trace produced on track 35. Gate 47 will then be closed, and the count stored in the readout device 52 by counter 50 will be indicative of the travel time of seismic waves from vibrator 71 to geophone 91.

While the correlating apparatus 84 may be of many types well known to the art, such as the type using a cross multiplying circuit feeding an integrator, the apparatus illustrated in FIG. 2 is preferred. The signals to be correlated, such as those appearing on lines 65 and 82, are fed to squaring amplifiers 93 and 95, respectively, where they are converted to square wave pulses having a pulse duration equal to the time interval between cross-overs from one polarity to the opposite polarity. Furthermore, squaring amplifier 95 also acts as an inverter such that if identical signals are fed to circuits 93 and 95, the output signal of circuit 95 would have an opposite phase relationship, or polarity reversal, with respect to the signal produced by circuit 93. Output terminal 93A is connected to one input terminal 97A of a bridge rectifier, and output terminal 95A of amplifier 95 is connected to the other terminal 97B of the bridge rectifier. The other terminals 93B and 95B of amplifiers 93 and 95 are connected to ground or to each other such that the output channels of the circuits 93 and 95 are effectively connected in series across terminals 97A and 97B of the bridge rectifier. An integrating circuit comprising a resistor 99 and integrating capacitor 101 are connected in series across the output terminals 97C and 97D of the bridge rectifier. The integrating capacitor 101 is connected to the input circuit of an amplifier 103, the output of which is connected to line 55 and which comprises the output of the correlator.

The operation of the apparatus of FIG. 2 is as follows. Assume that identical pseudo-random signals are applied to circuits 93 and 95, which are of identical waveform but which are displaced apart in time. The pulses appearing across bridge rectifier output terminals 97C and 97D will be of both positive and negative polarity, and signals of positive polarity will be substantially equal to the signals of negative polarity so that the voltage appearing across integrating capacitor 101 and on line 55 will be of approximately zero amplitude. When the signals are brought into time coincidence, however, the pulses at the bridge output terminals will be of the same amplitude such that the potential at terminal 97D will be positive with respect to that at terminal 97C. Therefore, the voltage across capacitor 101 will rise to a positive peak. As the signals appearing on lines 65 and 82 are again moved out of time coincidence, the voltage across capacitor 101 will reduce and again assume a very small magnitude near zero.

The invention is not necessarily to be restricted to the specific structural details, arrangement of parts, or circuit connections herein set forth, as various modifications thereof may be effected without departing from the spirit and scope of this invention.

What is claimed is:

1. Apparatus for measuring travel time of seismic waves between an electro-seismic wave transducer means at the earth's surface for producing continuous wave seismic signals variable in amplitude in accordance with variations in the amplitude of actuating electrical signals connected thereto, and a geophone in a borehole in the earth, comprising:

terminal means for connection to said geophone;
seismic wave detector means for positioning in the immediate vicinity of said transducer means to produce electrical signals indicative of seismic waves injected into the earth by said transducer means;
recording and reproducing means for
producing a timing pulse train in a first signal channel thereof,
producing a pseudo-random electrical signal in a second signal channel thereof for driving said transducer means,
recording and reproducing electrical signals in third, fourth, and fifth signal channels thereof,
producing a time reference pulse at the beginning of an electrical signal reproducing cycle;
correlating means having first and second input circuits and an output circuit, for producing a signal in said output circuit having an amplitude that is variable in accordance with the degree of correlation between electrical signals fed to said first and second input circuits thereof;
means selectively connecting said third signal channel to said detector means and to said first input circuit of said correlating means, selectively connecting said fourth signal channel to said terminal means for recording said geophone signals, and to said second input circuit of said correlating means for feeding previously recorded reproduced signals to said correlating means, and selectively connecting said fifth signal channel to said correlating means output circuit for recording the output signals of said correlating means;
said recording and reproducing means being adapted to produce an output pulse in said fifth signal channel thereof on a reproducing cycle thereof at a correlation extreme of the signal recorded therein; and
means connected to said recording and reproducing means for counting the number of pulses in said timing pulse train on a reproducing cycle thereof between production of said time reference pulse and production of a signal in said fifth signal channel indicative of maximum degree of correlation.

2. Apparatus for measuring travel time of seismic waves between an electro-seismic wave transducer means at the earth's surface for producing continuous wave seismic signals variable in amplitude in accordance with variations in the amplitude of actuating electrical signals connected thereto, and a geophone in a borehole in the earth, comprising:

terminal means for connection to said geophone;
seismic wave detector means for positioning in the immediate vicinity of said transducer means to produce electrical signals indicative of seismic waves injected into the earth by said transducer means;
recording and reproducing means including
a multitrack recording medium on which electrical signals can be recorded in reproducible form as a plurality of traces, said recording medium having a clock pulse signal recorded on a first track thereof, and a pseudo-random continuous signal recorded on a second track thereof,
first means for producing a time reference actuating pulse at the beginning of a reproducing cycle,
first and second heads for reproducing the recorded signals on said first and second tracks, said second reproducing head being connected to said transducer means for supplying actuating electrical signals thereto,
third, fourth, and fifth heads for recording electrical signals on third, fourth, and fifth tracks of said recording medium and for reproducing said electrical signals,
means for adjusting the position of said fourth and fifth heads relative to the position of said third head;
correlating means having first and second input circuits and an output circuit, for producing a signal in said output circuit having an amplitude variable in accordance with the degree of correlation between electrical signals fed to the first and second input circuits thereof;
means for connection to the recording and reproducing means for counting the number of pulses in said timing pulse train between production of said time reference pulse and production of a large amplitude signal by said fifth head; and
means selectively connecting said third head to said detector means and to said first input circuit of said correlating means, selectively connecting said fourth head to said terminal means and to said second input circuit of said correlating means, and selectively connecting said fifth head to said correlating means output circuit and to said counting means.

3. Apparatus for measuring travel time of seismic waves between a transducer means at the earth's surface for producing continuous wave seismic signals variable in amplitude in accordance wtih variations in the amplitude of actuating electrical signals connected thereto, and a geophone in a borehole in the earth, comprising:

terminal means for connecting to said geophone;
seismic wave detector means for positioning in the immediate vicinity of said transducer means to produce electrical signals indicative of seismic waves injected into the earth by said transducer means;
recording and reproducing means including
a rotatable transport drum,
a multitrack recording medium on said drum on which electrical signals can be recorded in reproducible form as a plurality of traces, said recording medium having a clock pulse signal recorded on a first track thereof, and a pseudo-random continuous signal recorded on a second track thereof,
first means for producing a time reference pulse at the beginning of a reproducing cycle,
first and second heads for reproducing the recorded signals on said first and second tracks, respectively, said second reproducing head being for connection to said transducer means for applying activating electrical signals thereto,
third, fourth, and fifth heads for recording electrical signals on third, fourth, and fifth electrical tracks of said reproducing medium and for reproducing said electrical signals,
means for rotating said fourth and fifth heads about said drum relative to said third head at a predetermined fraction of the speed of rotation of said drum;

correlating means having first and second input circuits and an output circuit, for producing a signal in said output circuit having an amplitude variable in accordance with the degree of correlation between electrical signals fed to the first and second input circuits thereof;

an electrical gate means having an input circuit connected to said first means, an output circuit, a gate opening circuit, and a gate closing circuit operative to pass an electrical signal from said input circuit thereof to said output circuit thereof after an actuating signal is applied to said gate opening circuit and before an actuating signal is applied to said gate closing circuit;

counting circuit means connected to said output circuit of said electrical gate means for counting electrical pulses appearing in said output circuit of said electrical gate means;

means selectively connecting said third head to said detector means and to said first input circuit of said correlating means;

means selectively connecting said fourth head to said terminal means and to said second input circuit of said correlating means; and means selectively connecting said fifth head to said correlating means output circuit and to said gate closing circuit.

4. The apparatus of claim 3 wherein said correlating means comprises a first input circuit including a squaring amplifier, a second input circuit including a squaring amplifier, a bridge rectifier circuit having input circuits connected to said squaring amplifiers and an output circuit, an integrating circuit connected to the output circuit of said bridge circuit, the output circuit of said integrating amplifier comprising the output circuit of said correlating means.

5. Apparatus for measuring travel time of seismic waves between an electro-seismic wave transducer means at the earth's surface for producing continuous wave seismic signals variable in amplitude in accordance with variations in the amplitude of actuating electrical signals connected thereto, and a geophone in a borehole in the earth, comprising:

terminal means for connection to said geophone;

seismic wave detector means for positioning in the immediate vicinity of said transducer means to produce electrical signals indicative of seismic waves injected into the earth by said transducer means;

means including recording and reproducing means, for producing a pseudo-random electrical signal in a first signal channel thereof for driving said transducer means, and recording and reproducing electrical signals in second, third, and fourth signal channels thereof;

correlating means having first and second input circuits and an output circuit, for producing a signal in said output circuit having an amplitude that is variable in accordance with the degree of correlation between electrical signals fed to said first and second input circuits thereof;

means selectively connecting said second signal channel to said detector means and to the first input circuit of said correlating means, selectively connecting said third signal channel to said terminal means for recording said geophone signals, and to said second input circuit of said correlating means for feeding previously recorded reproduced signals to said correlating means, and selectively connecting said fourth signal channel to said correlating means output circuit for recording the output signals of said correlating means;

said recording and reproducing means being adapted to produce an output signal in said fourth signal channel thereof on a reproducing cycle thereof at a correlation extreme of the signal in the output circuit of said correlating means;

said travel time being equal to the time on the time axis of the trace produced by signals in said third signal channel to a correlation peak recorded from electrical signals in said fourth signal channel.

No references cited.

BENJAMIN A. BORCHELT, *Primary Examiner.*

R. M. SKOLNIK, *Assistant Examiner.*